United States Patent [19]

Arce

[11] 4,045,623
[45] Aug. 30, 1977

[54] SHORT CIRCUIT INDICATOR FOR A TERMINATOR MATRIX

[76] Inventor: Luis Albert Arce, 5875 Obispo, Long Beach, Calif. 90805

[21] Appl. No.: 682,398

[22] Filed: May 3, 1976

[51] Int. Cl.² ............................................. H04M 3/22
[52] U.S. Cl. ......................... 179/175.2 R; 179/18 ET
[58] Field of Search .................. 179/175.2 R, 18 ET, 179/175, 175.23, 175.2 C

[56] References Cited

U.S. PATENT DOCUMENTS

| | | | |
|---|---|---|---|
| 3,099,720 | 7/1963 | Gotthardt | 179/175.2 R |
| 3,725,614 | 4/1973 | Slana | 179/175.2 R |
| 3,863,032 | 1/1975 | O'Dea et al. | 179/18 ET |
| 3,863,034 | 1/1975 | Morrison | 179/18 ET |

*Primary Examiner*—Douglas W. Olms
*Attorney, Agent, or Firm*—Fulwider, Patton, Rieber, Lee & Utecht

[57] ABSTRACT

A matrix of electrical termination points arranged in pairs is provided with a detection circuit for detecting short circuits between termination points. A transistor circuit is associated with each pair of termination points. A connection is provided from one of the points in each terminal pair to the transistor base which is forward biased in the absence of short circuits. A collector-emitter connection is provided through the transistor to the other terminal point in the terminal pair. A current indicator responsive to the collector-emitter current is provided for each transistor circuit. When the transistor base is forward biased, a collector-emitter current actuates the current indicator associated therewith. Short circuits between terminal points within a terminal pair greatly reduces collector-emitter current and short circuits between terminal points of different terminal pairs causes the base current of the transistor of at least one transistor circuit to be bypassed, thereby removing the forward bias current of that transistor. In both instances, the current indicator is deactuated.

11 Claims, 2 Drawing Figures

SHORT CIRCUIT INDICATOR FOR A TERMINATOR MATRIX

FIELD OF THE INVENTION

The present invention relates to an electrical device for detecting short circuits between matrix terminal points arranged in pairs. The electrical detection circuit is useful for actuating alarms indicating erroneous electrical connections between any terminals in the matrix. One principal application of the detection circuit is in telephone system central offices in association with telephone equipment switching systems. For example, the detection circuit may be used in association with a Number 5 Crossbar translator frame manufactured by the Western Electric Company. This is a switching machine that has wide application in telephone switching.

BACKGROUND OF THE INVENTION

In the past, various electrical devices have been employed for detecting erroneous or accidental electrical connections between terminal points arranged in pairs in a matrix. One such device is disclosed in U.S. Pat. No. 3,863,032. In this detection circuit, two separate detecting devices are required for use in association with each pair of electrical terminals in the matrix. The first detecting circuit senses the potential between the associated terminals and generates an electrical alarm signal when a short circuit exists across the terminal points in that pair. A second detecting circuit associated with the same pair has input connections from one of the terminal points in the associated pair and also from the first detecting circuit. The second detecting circuit is actuated by an electrical short between terminal points in different pairs.

Electrical devices for detecting short circuits find widespread application in association with telephone equipment. Typically, subscriber lines from individual telephones terminate at a telephone system central office in an electronic switching machine, commonly termed a crossbar switching machine. The individual subscriber lines have connections which appear as terminal points in a translator frame of the switching machine. Each pair of terminator points represents a single subscriber. A large number of different terminal pairs are arranged on a translator frame in a matrix.

Translator frames are used to detect the source of telephone calls. A read-only memory is used in the translator for identifying the line and location of the customer originating the call. The telephone number of this customer is transmitted to a computer, and a tape punch machine is activated to record the proper billing information so that the telephone call is charged to the proper subscriber. Because of service starts, disconnects, and rearrangements, there is continuous wiring and soldering activity at the translator frames in telephone equipment central offices. That is, workmen are constantly working in and around the translator frame to make repairs and changes, which are called service order activities.

In performing service order activities, frequently bits of wires, solder, or other metallic parts fall into the congested translator frames, thus causing terminals in the translator frame to become short circuited. Short circuits also occur when the telephone framemen inadvertently make erroneous connections on the translator frame. Whatever the cause, the result of such short circuits is that two subscribers are often charged for the same call. Such erroneous charges give rise to customer complaints and effect the index of the central office where the terminator frame is located.

Telephone crossbar switching equipment is typically provided with internal error checking circuitry. That is, the crossbar switcher will detect erroneous connections or short circuits between its terminals, but such detection requires actual use of the translator frame by a subscriber. Internal short circuit detection therefore occurs only after subscriber use and after an erroneous charge has already been. Short circuit detection systems of the type provided by the present invention, therefore, are designed to detect short circuits and provide a warning of their existance before an erroneous charge to a telephone subscriber results.

SUMMARY OF THE INVENTION

In a broad aspect the present invention is an improved circuit for detecting short circuits in an electrical terminal matrix wherein terminal points are arranged in pairs with loads connected across each pair, and the pairs are connected in parallel in an electrical power supply line, and wherein at least one of the points in a terminal pair is maintained at a unique electrical potential relative to all corresponding terminal points in other terminal pairs. The improved short circuit detection device of the present invention operates to detect short circuits between any combination of terminal points. A transistor or transistor arrangement is provided in association with each pair of terminal points. The base of the transistor is connected to one terminal point in the associated terminal pair, and the emitter connection is provided to the other terminal point in the same terminal pair. A current indicating means associated with each terminal pair is operatively connected to respond to collector-emitter current through the transistor. In this manner, in the absence of short circuits between terminal points, a forward base bias is maintained on the transistor. This sustains a collector-emitter current to operate the current indicating means. A short circuit between points in different terminal pairs removes the base current bias, while a short circuit between the points within the associated terminal pair greatly reduces the emitter-base voltage. In this manner, a short circuit between terminal points in any instance deactivates the current indicating means.

One object of the invention is to provide a short circuit monitoring device that is in continuous operation and which instantly detects any short circuits or crosses between terminal points in the translator frame matrix. If, as is frequently the case, a telephone frameman is in the vicinity, he is immediately alerted to the trouble. Many times the trouble has resulted from his own activity so that little time is lost in ascertaining the exact trouble location and correcting the trouble before erroneous billing results.

Another object of the invention is to provide a short circuit monitoring device which uses but a single detection circuit in association with each terminal pair monitored. This substantially reduces the cost of the monitoring system as contrasted with conventional devices.

A related object of the invention is to provide a monitoring circuit of the type described which employs only one or two transistors for each terminal pair monitored. In contrast, conventional systems, such as that depicted in U.S. Pat. No. 3,863,032, requires a plurality of comparator circuits in association with each terminal pair monitored. These comparator circuits are typically operational amplifiers, each of which employs a plurality of transistors.

Another object of the invention is to provide a monitoring circuit for telephone switching equipment translator frames which is protected from transient voltages in a manner that does not require the terminal points to be clamped to ground. That is, in conventional short circuit detection systems the voltages at each terminal point are limited by connecting the terminal points to ground through clamping diodes. Thus, the detection circuit is protected from unduly large transient voltages. The connection of the terminal points to ground through diodes, however, interferes with the operation of the translator frame when the monitoring circuit is connected to the upper field of the translator frame. Thus, conventional short circuit detection systems have only limited usage in association with telephone translator frames. The translator frames of telephone crossbar switching systems are divided into upper and lower fields, the terminals of which are connected in common in a matrix. Each terminal pair in the upper field is coupled to one side of a relay coil. The relay coil is energized when the translator frame is operated so that the upper field orginates any transient voltages that occur. The connection of conventional short circuit monitoring systems to the upper field interferes with the induction or step-up voltage to the coils because of the clamping diodes shunt all the current to ground. This disturbs the magnitude of the inductive field created. In contrast, the present invention does not require the terminal points to be grounded, but rather employs gate limiting diodes at the base and emitter of the transistor means utilized.

A further object of the present invention is to provide a short monitoring system in which a short circuit is indicated by extinguishing a visual current indicator. To the contrary, in conventional systems, a short circuit is indicated by actuating a visual indicator. Thus, in such conventional systems the absence of a visual indication is treated as verifying the absence of any short circuits. However, the absence of lighted indicators in conventional systems may, in fact, merely mean that the monitoring system is inoperative. A positive indication of operability, as in the present invention is much more meaningful. With the present invention the deactivation of one or more visual indicators can only mean a short circuit in the system.

DESCRIPTION OF THE DRAWINGS

The various advantages and features of the present invention may be more readily ascertained with reference to the accompanying drawings in which.

DETAILED DESCRIPTION OF THE INVENTION

Figure 1:
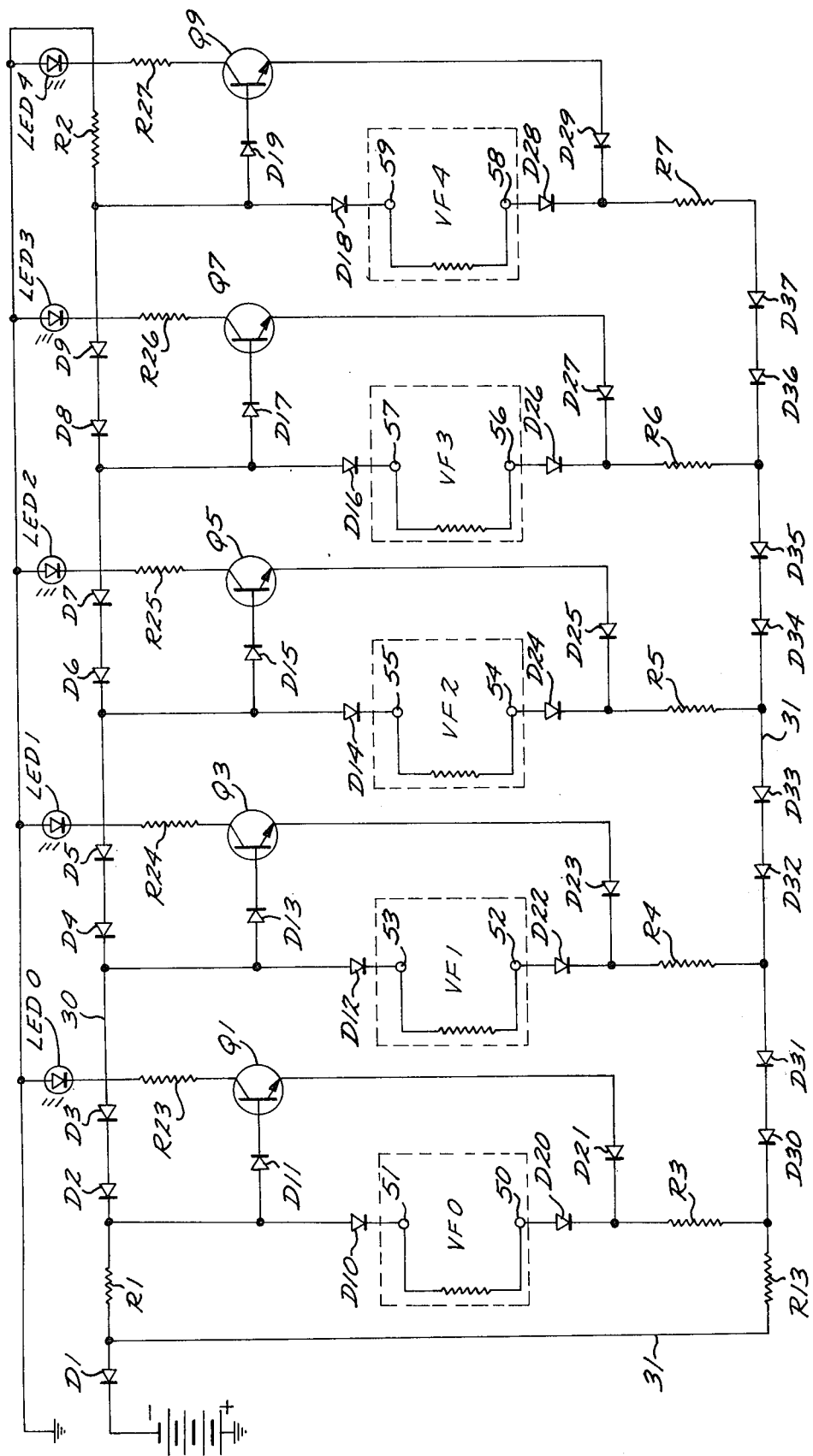
FIG. 1 is a schematic diagram of a simple embodiment of the invention.

Referring now to the drawings and in particular to FIG. 1, there is illustrated an electrical circuit for detecting electrical shorts among matrix terminal points which are arranged in pairs. The terminal point pairs are indicated at VF0 through VF4. The terminal pair VF0 includes the terminal points 50 and 51. The terminal pair VF1 includes the terminal points 52 and 53, and so forth. The terminal points represented by even numbered reference numerals will hereinafter be collectively referred to as EVEN points while those points represented by odd numbered reference numerals will be collectively referred to as ODD points. It is to be understood that this reference terminology is purely a matter of choice, and any alternative reference designations could be used instead. It can be seen that the terminal pairs VF0 through VF4 are connected in parallel in one of two D.C. voltage power supply bus lines across the parallel leads 30 and 31 see (FIG. 1). The ODD terminal points are connected to the −48 volt central office battery source and ground through resistors R1 and R2 in lead 30. Typically, the resistor R1 has a value of 68K ohms and the resistor R2 has a value of 82K ohms. The EVEN terminal points are connected to the −48 volt source through a resistor R13 of 10K ohms in line 31. A load is connected across each pair of terminal points VF0 through VF4. This load, within this particular equipment, consists of two series resistors. Normally each load between terminal points is 10K ohms. With no short circuits between terminal points, as under normal operating conditions, there is a voltage drop of about 0.3 volts across the points of each terminal pair.

In the short circuit detection system of FIG. 1, the ODD terminal point in each of the terminal pairs VF0 through VF4 is maintained at a unique voltage potential relative to the other ODD terminal points in the other of the pairs VF0 through VF4 during normal operating conditions. The potential differential between sequential ODD points is not large and is achieved by virtue of the diodes D2 through D9 inserted in the lead 30 as indicated in FIG. 1 with two diodes lying between each of the adjacent voltage taps for the ODD terminal points. In like manner, the diodes D30 through D37 are similarly situated in lead 31 between the voltage taps of the EVEN terminal points. Thus, it can be seen that the terminal point 59 of terminal pair VF4 is more positive than is the terminal point 51 of terminal pair VF0. All of the ODD terminal points are maintained at a fixed voltage differential with respect to each other and vary in stepwise fashion from the most positive terminal point 59 to the most negative terminal point 51.

A transistor circuit is associated with each of the terminal pairs VF0 through VF4. That is, transistor Q1 is associated with terminal pair VF0 while transistor Q3 is associated with terminal pair VF1. Transistor Q5 is associated with terminal pair VF2, transistor Q7 is associated with terminal pair VF3 and transistor Q9 is associated with terminal pair VF4. Each of these transistors has a base connection to the ODD terminal point in the associated terminal pair. Similarly, each of these transistors has a collector-emitter connection extending between the EVEN terminal point in the same associated pair and the central office ground. Gate limiting diodes D11, D13, D15, D17, and D19 are located at the bases of their respective transistors. Likewise, gate limiting diodes D21, D23, D25, D27, and D29 are located at the emitter of their associated transistors. In addition, each of the gate limiting diodes D10, D12, D14, D16, and D18 is connected between a single associated one of the ODD terminal points and the base connection of the transistor associated therewith. Similarly, gate limiting diodes D20, D22, D24, D26, and D28 are connected between a single associated EVEN terminal point and the emitter connection of the associated transistor. Current limiting resistors R3 through R7 are similarly associated with each of the indicated terminal pairs VF0 through VF4.

The foregoing arrangement of gate limiting diodes D10 through D29 protects the short circuit detection device from transient voltage spikes of either positive or negative polarity, yet does not require either the EVEN or ODD terminal points to be clamped to ground. This allows the detection device of this invention to be used with the upper field of the translator frame as well as the lower field, as previously explained.

It can be seen with reference to each of the terminal pairs VF0 through VF4 that the point of connection to the lead 30 of each pair is more positive than the point of connection to the line 31 by virtue of the possible current paths between the −48 volt central office battery and the central office ground. This arrangement provides a forward bias of the transistors Q1, Q3, Q5, Q7, and Q9.

Associated with each of the transistors Q1, Q3, Q5, Q7 and Q9 are their respective current indicators which may be light emitting diodes LED 0, LED 1, LED 2, LED 3 and LED 4. The resistors R23 through R27 are located in series with the current indicators to control the amount of current which is allowed to pass through the collector-emitter connections.

As previously indicated, in the absence of short circuits the power supply lead 30 maintains the ODD terminal points at a more positive voltage than their associated EVEN terminal points, with the potential at each of the ODD terminal Points varying in stepwise increments from that at the other ODD terminal points. Thus, the bases of the transistors of FIG. 1 are forward biased so that collector-emitter currents are created through those transistors. These currents actuate each of the light emitting diodes LED 0 through LED 4. If a short circuit occurs between terminal points, however, one or more of the light emitting diodes will be extinguished. For example, if a short circuit occurs across the terminal points 50 and 51 in the terminal pair VF0, the base and emiter voltage of the transistor Q1 is greatly reduced, since points 50 and 51 are at the same voltage potential. With little or no voltage differential between the base and emitter of the transistor Q1, there is no collector-emitter current flow. Thus, LED 0 is deactivated. The deactivation of this current indicator provides a visual indication of a short circuit within the terminal point matrix.

If a short circuit occurs between terminal points in different terminal pairs, for example a short circuit between the points 51 and 53, LED 0 will similarly be extinguished. If a short does occur between these points a back bias will be formed. Point 53 is more positive than point 51. The bias at D10 prevents any current from flowing to either diode D10 or diode D11. From point 53 some current will flow across the short circuit to point 51 and then to point 50 through the load connected across points 51 and 50, and then through the diode D20 to lead 31. Another portion of the current will flow as before from point 53 to point 52 and then through diode D22 to lead 31. Therefore, by virtue of the short circuit between points 51 and 53, the forward bias current is removed from the base of transistor Q1. Without the forward bias current there is no collector-emitter current and the light emitting diode LED 0 is extinguished.

In a similar manner, if a short circuit exists between the points 51 and 59, the forward bias will be removed from the transistor Q1. The current indicator LED 0 is extinguished, although all of the other current indicators LED 1, LED 2, LED 3 and LED 4 will remain illuminated. The deactivation of light emitting diodes LED 0 in this particular situation discloses that a short circuit exists within the terminal matrix, and that the short is between terminal pair VF0 and another point in an unidentified terminal pair. The precise location of the other shorted terminal point would not immediately be available from the short detection device of FIG. 1. However, by reference to the preferred embodiment of the invention depicted in FIG. 2, the exact location may be ascertained.

Figure 2:
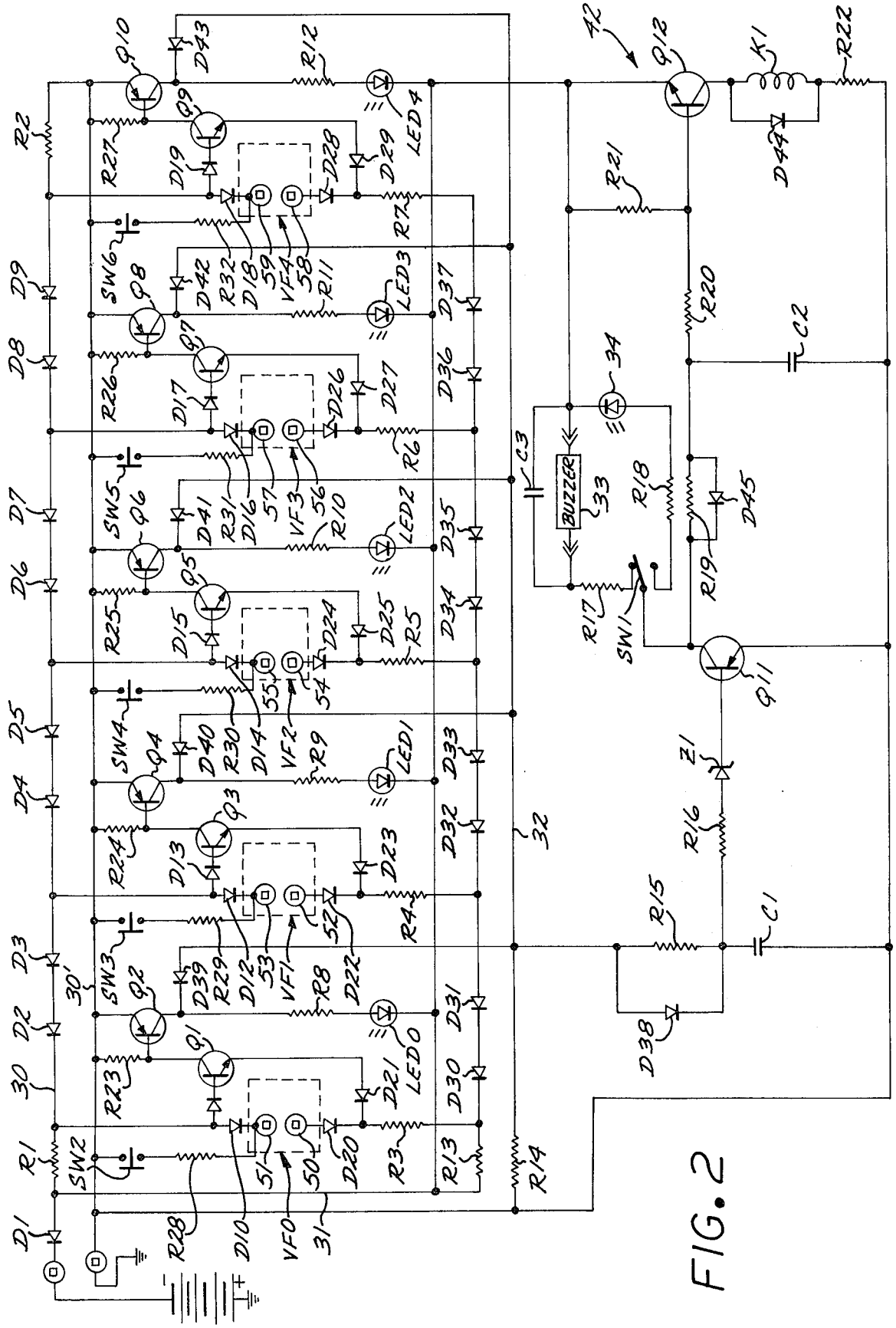
FIG. 2 is a schematic diagram of a preferred embodiment of the invention.

The transistor arrangement of FIG. 2 differs from that of FIG. 1 in that the transistors Q1, Q3, Q7, and Q9 are primary transistors, and a booster transistor is also associated with each terminal pair. Thus, the base of booster transistor Q2 is connected to the collector-resistor R23 of transistor Q1. A collector-emitter connection through transistor Q2 is provided between the source of the power supply. The current indicators LED 0 through LED 4 are connected in the collector-emitter lines of the booster transistors Q2, Q4, Q6, Q8, and Q10, rather than in the collector-emitter connections of the primary transistors. The only reason that a booster transistor is provided is to increase the current through the light emitting diodes. With the present state of the art, the collector current from the more economical transistors which can be used as the transistors Q1, Q3, Q5, Q7 and Q9 is insufficient to illuminate the light emitting diodes presently commercially available. For this reason, it is more economical to provide two transistors for each of the terminal pairs VF0 through VF4 than to provide single more expensive transistors for each terminal pair.

The booster or light driver transistors Q2, Q4, Q6, Q8 and Q10 are of the PNP type. The primary transistors used are of the NPN variety. A substitution for either type could be made without impairing the operation of the circuit, although a different biasing arrangement would then be required.

As has been explained during normal operation, the primary transistors are forward biased allowing most of their collector currents to develop voltages across R23 through R27. These voltages and currents turn on the booster transistors Q2, Q4, Q6, Q8 and Q10. The collector currents of the booster transistors are limited to resistors R8 through R12 to provide a proper value to illuminate the light emitting diodes LED 0 through LED 4. The diodes D39 through D43 provide a standard way of arranging or gating multiple lines to a common bus line 32 to provide a common signal to a capacitor C1.

In the operation of the circuit of FIG. 2, if a short occurs between the terminal points 50 and 51 of the terminal pair VF0, the primary transistor Q1 is turned off. This in turn removes the potential applied to the resistor R23 which in turn removes the base bias of the booster transistor Q2. This causes the collector current of transistor Q2 to likewise cease and allows the −48 volt central office battery potential to appear at the collector of transistor Q2. This voltage causes the capacitor C1, which may have a value of 2 microfarads, to begin charging with this negative voltage. The rate of charge is governed by the time constant of the circuit as the capacitor C1 is charged through resistors R8 and R15, which may have values of 8.2K ohms and 150K ohms respectively. If the short circuit across terminal points 50 and 51 persists, thereby preventing the transistors Q1 and Q2 from conducting a collector current, the capacitor C1 will be charged sufficiently to overcome the voltage requirement of zener diode Z1 and thereby forward bias transistor Q11. The threshold voltage of the zener diode Z1 may be 33 volts. The resistor R16 may have a value of 47K ohms and is used to limit the current into the base of the transistor Q11. When the transistor Q11 is turned on, its collector current is allowed to operate either the buzzer 33 or the light emitting diode 34 depending on the position of the switch S1. A resistor R18 of 8.2K ohms is provided to limit current through the light emitting diode 34, and the resistor R17 limits the current through the buzzer 33.

The switch S1 is a manually operable bipolar switch connected in the alarm circuit 42. The switch S1 allows one, but not both of the alarm indicators 33 and 34 to be preferentially selected. Thus, either of these alarm indicators may be selected for connection in parallel with the current indicating light emitting diodes LED 0 through LED 4. Because of the thresholding requirement of the zener diode Z1 and the time required to charge the capacitor C1, there is a time delay after the actuation of any one or more of the light emitting diodes LED 0 through LED 4 to the activation of either the selected alarm indicator 33 or 34. A further delay is built into the circuit if the buzzer 33 is selected by switch S1 by the provision of another capacitor C3 which must be charged before the buzzer will be activated. The value of capacitor C3 may be 2 microfarads.

When collector-emitter current flows in the transistor Q11, the capacitor C2 is also charged. Capacitor C2 may have a value of 78 microfarads. Again the rate of charging is limited by the resistor R19 which may have a value of 150K ohms. Diodes D45 and D38 are positioned across resistors R15 and R19 respectively in order to provide a quick path of discharge for the respective capacitors C1 and C2. This prevents intermitent shorts from building up charges in the capacitors C1 and C2.

Once the capacitor C2 reaches a predetermined voltage potential, it triggers the transistor Q12. Resistors R20 and R21 limit the voltage and performs a voltage division function at the base of transistor Q12. Resistors R20 and R21 may have values of 100K ohms and 10K ohms respectively. When transistor Q12 is turned on, it energizes a relay K1. Resistor R22 (which may be 5.6K ohms) limits the energizing current through the relay K1. The contacts of the relay K1 may be wired to trigger any type of additional alarm. Normally these contacts would be wired into the central office alarm circuit to attract attention when a short is present in an unattended frame and when the light emitting diodes LED 0 through LED 4 and the buzzer 33 or LED 34 have failed to produce corrective action. Thus, it can be seen that a sequentially actuable series of alarm indicators are provided. First, any of the current indicators LED 0 through LED 4 is extinguished. Normally, the switch S1 is in the position indicated in FIG. 2. If the short persists, the buzzer 33 would then sound. The buzzer can be turned off by throwing the switch S1 to the position opposite that indicated in FIG. 2. In this position the LED 34 will be illuminated. If the short continues to exist, the central office alarm will be triggered by the relay K1.

This sequentially actuable alarm system provides ample time to clear trouble prior to the final warning provided by the central office alarm system.

From the previous explanation with respect to FIG. 1, it has been explained that the transistor devices associated with each of the terminal pairs VF0 through VF4 are forward biased in the absence of any short circuits among the terminal points 50-59. A short circuit between the terminal points of a single terminal pair is the only condition in which there would be a current increase through the diodes D10, D12, D14, D16 or D18. This would occur because the load normally present between the points of a single terminal pair would be shorted out of the system. This same short, however, would act to remove the voltage differential between the base and emitter of the primary transistor. That is, the small current of around 34.9 microamps that would normally flow through a 10K ohm resistor load connected across the terminal points of a single terminal pair is shunted by the short circuit. Therefore, since virtually there would be no resistance between the emitter and the base of the primary resistor, there would be no collector-emitter current flowing in the primary transistor. Such a condition extinguishes at least one of the light emitting diodes LED 0 through LED 4 in the short circuit detection system.

With any other combination of short circuits, other than between points in a single terminal pair, there is no current flow due to the back bias of the diodes to produce a forward bias of the bases of the transistors associated with the terminal pairs operated at lower potentials and within which a short circuited terminal point exists. For example, if a short exists between the terminal point 50 and 52, the current path through the diode D10 is back biased and no base current is available to the transistor Q1. Likewise, if a short exists between the terminal points 53 and 54, diode D12 is also back biased and no base current is available to transistor Q3.

Similarly, if the terminal point 50 were short circuited to the terminal point 53, or if the terminal point 51 were shorted to the terminal point 52, there likewise would be no current to the base of transistor Q1. This is because the terminal 53 of the terminal pair VF1 is operated at a more positive voltage than is the terminal point 51 of the pair VF0. Back biasing would exist at the base of transistor Q1 by a short circuit acting through either the terminal point 51 or through terminal point 50 and through the 10K ohm load resistor.

As previously indicated in some instances one of the current indicators LED 0 through LED 4 will be extinguished as a result of a short circuit. More specifically, a short circuit among terminal points in different terminal pairs deactivates only the current indicator associated with the least positive terminal pair to which voltage is applied. For example, if a short circuit exists between terminal points 50 and 57, the current indicator LED 0 would be extinguished. Thus, an observer would know that one of the short circuited terminals was in the terminal pair VF0. This would be apparent since the current indicator LED 0 would be extinguished. To find the other shorter terminal point, a manually operable switch is associated with each pair of terminal points. That is, the switch S2 is associated with the terminal pair VF0 while the switch S3 is associated with the terminal pair VF1. Similarly, switches S4, S5, and S6 are respectively associated with terminal pairs VF2, VF3, and VF4.

All of the switches S2 through S6 remain open during normal operation. Each of the switches is located in an electrical connection from the grounded power supply line 30' to the ODD terminal point in the terminal pair associated therewith. Thus, continuing with the example previously recited in which the terminal point 50 was shorted to the terminal point 57, the frameman would know that one of the points 50 and 51 was shorted. He would then operate the switch S1 thereby back biasing the base diodes of the primary transistor Q1 and Q7. This shows that the short circuit is between one of the terminal points of pair VF0 and one of the terminal points of pair VF3.

If a short circuit is entirely within a single terminal pair, again only a single current indicating LED will be extinguished. In this situation, however, when the frameman depresses the switch associated with the extinguished LED, there will be no effect on the other current indicating LED's. This is because there is no back bias applied to any other terminal other than within the terminal pair in which the short circuit exists.

The push buttons S2 through S6 also serve to verify the proper connection of the terminal points to the load resistors. Any open leads will be detected by operation of the push button switches. That is, the frameman, in installing the short detection circuit, should sequentially depress each of the swiches S2 through S6. The current indicator associated with the terminal pair to which the depressed switch is connected should be extinguished if all terminal point connections are proper. Failure of a current indicator to be extinguished indicates an open connection.

From the foregoing explanation it can be seen that a variety of alternative circuit configurations and electrical component modifications may be employed without departing from the scope of the invention. The essence of the invention lies in the use of a single transistor circuit to detect short circuits in a matrix of terminal points arranged in terminal pairs. Short circuits between the points in a terminal pair essentially removes the potential differential between the base and the emitter connection of the transistor circuit, while a short between points in different terminal pairs removes the forward bias current from the transistor circuit.

While the foregoing invention has been discussed in association with its application to telephone equipment switching machines, this is not the only application of the invention. The invention may be used to detect short circuits in any matrix of terminal points arranged in pairs.

I claim:

1. An electrical circuit for detecting electrical shorts among matrix terminal points in an electrical circuit termination framework having at least two opposing D.C voltage power supply bus lines, wherein said terminal points are arranged in pairs with the individual terminal points within each pair connected to opposite ones of said power supply bus lines and with a load connected across each pair of terminal points and with at least a first terminal point in each pair maintained at a unique voltage potential relative to corresponding first terminal points in other pairs under normal conditions, comprising: transistor means associated with each of said terminal pairs, each transistor means having a base connection to said first one of the terminal points in the associated pair and having a collector-emitter connection between the second one of the terminal points in the same associated pair and the other one of the two aforesaid power supply bus lines; and current indicating means responsive to the collector-emitter current of each of said transistor means to indicate changes in flow of current therethrough.

2. The electrical circuit of claim 1 wherein said transistor means comprises a primary transistor and a booster transistor, and the base of said primary transistor is connected to said first terminal point in the associated terminal pair and a collector-emitter connection is provided through said primary transistor between said second point in said associated terminal pair and the aforesaid other one of said power supply lines, and the base of the booster transistor is connected to the collector-emitter connection of said primary transistor, and a collector-emitter connection is provided through said booster transistor between said power supply lines, and said current indicating means is located in the collector-emitter connection of said booster transistor.

3. The circuit of claim 2 further comprising a manually operable switch associated with each pair of terminal points and normally maintained open and located in an electrical connection from the said other one of said power supply lines to said first terminal point in the associated pair of terminal points.

4. The circuit of claim 2 further comprised of gate limiting diodes located at the bases and emitters of each of said primary transistors and between each of said terminal points and the primary transistor connections thereto.

5. The circuit of claim 2 further comprising an alarm circuit connected in parallel with said current indicating means.

6. The circuit of claim 5 wherein said alarm circuit includes two alarm indicators connected in parallel and a manually operable bipolar switch connected in said alarm circuit whereby one of said alarm indicators can be preferentially selected to the exclusion of the other.

7. The circuit of claim 5 comprising sequentially actuable alarm indicators.

8. The circuit of claim 1 wherein said current indicating means comprise light emitting diodes.

9. The electrical circuit of claim 1 wherein said first ones of said terminal points are connected to a common power supply line and impedances are located in said common power supply line between adjacent connections of said first one of said terminal points thereto whereby each of said first terminal points is maintained at a fixed voltage differential with respect to the other first ones of said terminal points in the absence of short circuits between any of said terminal points and the voltage potential from said common power supply line applied to each of said first ones of said terminal points provides a forward bias current to the transistor means associated therewith in the absence of short circuits between any of said terminal points, and a short between any of said terminal points in different terminal pairs removes said forward bias current from at least one of said transistor means, and a short between terminal points within a transistor pair reduces the collector-emitter current in the transistor means associated therewith.

10. In an electrical circuit termination framework having at least two opposing D.C. voltage power supply lines in which said terminal points are arranged in pairs with the individual terminal points within each pair connected to opposite ones of said electrical power supply lines, and wherein at least one of said points in each terminal pair is maintained at a unique electrical potential relative to all corresponding points in other terminal pairs, the improvement comprising a circuit for detecting short circuits between any combination of said terminal points and including for each terminal pair a transistor with its base connected to one terminal point in the associated terminal pair and with an emitter-connection between the other terminal point in the same terminal pair and the electrical power supply line connected to said one terminal point, and with a current indicating means associated with each terminal pair operative in response to collector emitter current through said transistor, whereby in the absence of short circuits between terminal points a forward base bias is maintained on said transistor means, thereby sustaining a collector-emitter current to operate said current indicating means and a short circuit between points in different terminal pairs removes said forward base bias and a short circuit between the points within a terminal pair greatly reduces the emitter-collector current whereby a short circuit between terminal points in any instance deactivates said current indicating means.

11. The improved electrical terminal matrix of claim 10 wherein the absence of short circuits a voltage varying in stepwise increments is applied at said pairs of terminal points from one of said electrical power supply lines whereby a short circuit among terminal points deactivates only the current indicating means associated with the terminal pair to which the smallest voltage is applied in the absence of short circuits.

* * * * *